United States Patent [19]
Erickson et al.

[11] Patent Number: 4,855,338
[45] Date of Patent: Aug. 8, 1989

[54] METHOD FOR TREATING GRAFTED PROTEIN LATICES

[75] Inventors: David E. Erickson, Stow; Satish C. Sharma, Mogadore, both of Ohio

[73] Assignee: GenCorp Inc., Fairlawn, Ohio

[21] Appl. No.: 928,227

[22] Filed: Nov. 7, 1986

[51] Int. Cl.4 .......................... B01F 5/06; C08H 5/04
[52] U.S. Cl. ..................................... 523/335; 523/300; 527/201; 427/411; 162/164.1; 162/168.1
[58] Field of Search ................ 527/201, 202; 523/300, 523/335; 162/164.1, 168.1, 169; 252/302, 303, 304; 422/411

[56] References Cited

U.S. PATENT DOCUMENTS

| | | | |
|---|---|---|---|
| 3,781,236 | 12/1973 | Bassham et al. | 523/335 |
| 4,533,254 | 8/1985 | Cook et al. | 366/176 |
| 4,607,089 | 8/1986 | Riley et al. | 527/202 |
| 4,695,402 | 9/1987 | Finlayson et al. | 523/508 |

Primary Examiner—John Kight
Assistant Examiner—Nathan M. Nutter

[57] ABSTRACT

Microfluidization of latices of a graft copolymer of a conjugated diene monomer and a vinyl aryl monomer on a protein such as a soy protein reduces the viscosity of the graft copolymer latex.

6 Claims, No Drawings

METHOD FOR TREATING GRAFTED PROTEIN LATICES

This invention relates to the treatment of grafted protein latices.

The free radical, aqueous graft, inter- or over-copolymerization of a conjugated diene monomer and a vinyl aryl monomer on a protein using an azo initiator produces a latex which exhibits particle groupings which drastically increase the viscosity of the latex, especially at low shear rates.

Protein-modified latices for paper coatings have the advantages of containing no surfactant and containing soy protein dispersed in the binder, eliminating the need for protein solubilization by the customer. However, the latices have the disadvantage that low solids contents are normally obtained because of the high viscosities encountered. The low solids content makes it difficult to use economically such latices in certain paper coating formulations.

OBJECTS

An object of this invention is to avoid the difficulties alluded to above and to provide a method for producing a grafted protein latex having reduced viscosity.

Another object of this invention is to provide a grafted protein latex having reduced viscosity.

These and other objects and advantages of this invention will become more apparent to those skilled in the art from the following detailed description and working examples.

SUMMARY OF THE INVENTION

According to the present invention, it has been found that the viscosity of protein modified vinyl aryl-conjugated diene copolymer latices can be reduced by treatment of the latices with a Microfluidizer. The Microfluidization technique is based on a submerged jet principle in which two fluidized streams interact in microchannels in the interaction chamber. The technique is claimed to offer advantages over homogenization and sonication in producing emulsions and dispersions. The improvements obtained herein are believed to occur principally because of the breaking up of large particle groupings normally present in the protein-modified latices which contribute to increased viscosities by immobilization of water. Some irreversible particle agglomeration may also occur in some cases.

Reduced viscosity facilitates pumping and handling in further operations like preparing compositions for paper coatings and the like.

DISCUSSION OF DETAILS AND PREFERRED EMBODIMENTS

The graft copolymerization is done in alkaline aqueous media. The protein is dissolved or rendered finely divided (colloidal suspension) in aqueous ammonium hydroxide or other suitable aqueous alkaline material before polymerization is initiated by an azo initiator. In the graft copolymerization the conjugated diene monomer is used in an amount of from about 25 to 50 parts by weight, the vinyl aryl monomer is used in an amount of from 30 to 60 parts by weight and the protein is used in an amount of from 10 to 30 parts by weight, the total of all three ingredients being 100 parts by weight. In this graft polymerization process, added emulsifiers, colloids or surfactants are not needed.

Proteins, of course, in various forms are well known materials and have many uses. Please see "Enclocopedia of Polymer Science and Technology," John Wiley & Sons, Inc., Vol. 2 (1965), Vol. 8 (1968), Vol. 9 (1968), Vol. 11 (1969) and Supplement Vol. 2 (1977).

For example, they may be obtained as hydrolyzed collagen from fish and animal skin and bones, as albumen from blood and egg white, as casein from milk, as the gluten fractions from corn and wheat and/or the proteins derived from seeds and like such as soy beans, e.g., soy protein (preferred).

Examples of copolymerizable conjugated diene monomers which can be used are those diene monomers of from 4 to 6 carbon atoms such as butadiene-1,3 (preferred), isoprene, 2,3-dimethyl butadiene-1,3, piperylene, chloroprene and so forth and mixtures thereof. Examples of copolymerizable vinyl aryl monomers are those having from 8 to 12 carbon atoms such as styrene (preferred), alpha methyl styrene, p-tertiary butyl styrene, 3-ethyl styrene, methyl vinyl toluene and para vinyl toluene and the like and mixtures thereof.

A chelating agent is used in a very minor amount sufficient to chelate any interfering ions such as the ferric or ferrous ion, or other polymerization-interfering ion or material. In general it is used in an amount of from about 0.01 to 1.0, preferably about 0.05 part by weight per 100 parts by weight of the diene monomer, vinyl aryl monomer and protein. Examples of some chelating agents are trisodium ethylene diamine tetraacetate dihydrate (preferred), ethylenediaminetetraacetic acid tetrasodium salt, technical ethylenediaminetetraacetic acid tetrasodium salt, ethylenediaminetetraacetic acid tetrasodium salt dihydrate, ethylenediaminetetraacetic acid trisodium salt monohydrate, ethylenediaminetetraacetic acid disodium salt dihydrate, ethylenediaminetetraacetic acid, nitrilotriacetic acid disodium salt monohydrate, nitrilotriacetic acid, N-hydroxyethylethylenediaminetriacetic acid trisodium salt, N-hydroxyethylethylenediaminetriacetic acid trisodium salt dihydrate, ethyanoldiglycine disodium salt (or disodium N-hydroxyethyliminodiacetic acid), diethanolglycine sodium salt (or sodium dihydroxyethyl glycine) and the like and mixtures of the same.

The initiator or catalyst used is an oil-soluble azo initiator or catalyst. Azo initiators for free radical polymerization are well known. In this connection, please see the "Encyclopedia of Polymer Science and Technology," Vol. 2, 1965, pages 278-295, John Wiley & Sons, Inc. Of these initiators it is preferred to use the azonitriles. Examples of some of these compounds are azobisdimethylvaleronitrile, 2,2'-azobisisobutyronitrile (preferred), 2,2'-azobis-2-methylbutyronitrile and 2,2'-azobis (methylisobutyrate) and the like and mixtures of the same. Only minor amounts by weight of the initiator are necessary to effect copolymerization.

Chain transfer agents or modifiers are used during the graft copolymerization to control molecular weight, gel and so forth. While various modifiers or chain transfer agents have been proposed and may be used such as benzene, toluene, triphenyl methane, carbon tetrachloride and so forth, it is preferred to use mercaptans such as the alkyl and/or aralkyl mercaptans of from 8 to 18 carbon atoms of which the tertiary alkyl mercaptans are much preferred. Examples of some mercaptans are n-octyl mercaptan, n-dodecyl mercaptan, t-octyl mercaptan, t-dodecyl mercaptan (also preferred), p-tridecyl mercaptan, tetradecyl mercaptan, hexadecyl mercaptan and so forth and mixtures thereof. These modifiers are used generally in a total amount of from about 0.15 to 0.9 phm (parts by weight per 100 parts monomers).

Temperatures used during graft copolymerization should be sufficient to effect polymerization by activation of the catalyst and double bonds of the monomer(s). They should not be too high to cause a runaway reaction and not too low to retard polymerization. In general, the temperature is preferably from about 40° to 80° C. Times for polymerization may vary from about 8 to 14 hours depending on the degree of polymerization desired. Generally, it is desired to carry polymerization to about 100% conversion.

The graft copolymerization should be conducted under alkaline conditions utilizing materials like $NH_4OH$ and the like. In general, the pH of the polymerization media should be from about 8.5 to 10, preferably from about 9 to 9.5.

The water used during graft copolymerization should be free of deleterious materials and preferably should be distilled or ion exchanged. Sufficient water is used to enable maintenance of the emulsion or latex and to enable proper mixing or stirring of the ingredients during polymerization to obtain the desired rate and degree of polymerization, heat transfer and so forth. The solids content in the water may be from bout 30 to 40% by weight.

Graft copolymerization should be conducted in a closed reactor, such as a pressure reactor, fitted with a stirrer or other agitating means, evacuating means, heating and cooling means, with means to flush with or pump in an inert gas such as nitrogen, helium, argon, neon and the like if desired, with means to charge monomers, water, initiators, venting means, and with means to recover the polymer and so forth. The reactor should be cleaned or flushed between polymerization runs to remove traces of initiators, modifiers, residues and so forth which might interfere with subsequent polymerizations. There should be sufficient agitation or stirring of the polymerization media to ensure thorough mixing, diffusion, contact and so forth.

Free radical aqueous polymerization and copolymerization of ethylenically unsaturated monomers are well known to those skilled in the art. In this connection, please see Whitby et al, "Synthetic Rubber," John Wiley & Sons, Inc., N.Y., 1954; Bovey et al, "Emulsion Polymerization," High Polymers, Vol. IX, Interscience Publishers, Inc., 1955; Schildknecht, "Vinyl and Related Polymers," John Wiley & Sons, Inc., N.Y., 1952 and "Encyclopedia of Polymer Science and Technology," Vol. 3 (1965), Vol. 5 (1966), Vol. 7 (1967), Vol. 9 (1968) and Vol. 11 (1969), Interscience Publishers, a division of John Wiley & Sons, Inc., N.Y.

In the presence of the present invention, the polymerization may be considered as a graft copolymerization, over copolymerization, core/shell copolymerization or an interpolymerization. The technique of polymerizing or copolymerizing one or more monomers in the presence of a polymer or a substrate, "grafting technique," is known and is frequently called graft polymerization or graft copolymerization. In this connection, please see "Proceedings of the Third Rubber Technology Congress," 1954, W. Heffer & Sons, Ltd., Cambridge, pages 185-195; "Copolymerization," High Polymers, Vol. XVIII, Ham, Interscience Publishers, a division of John Wiley & Sons, N.Y., 1964; "Block and Graft Polymers," Burlant and Hoffman, Reinhold Publishing Corporation, N.Y., 1960; "Block and Graft Copolymers," Ceresa, Butterworth & Co. (Publishers) Ltd., London, 1962; "Block and Graft Copolymerization," Ceresa, Vol. 1 (1973) and Vol. 2 (1976), John Wiley & Sons, Ltd., N.Y., and "Graft Copolymers," Polymer Reviews, Vol. 16, Battaerd and Tregear, Interscience Publishers, a division of John Wiley & Sons, N.Y., 1967. The graft copolymer may contain all graft copolymer but also may be a mixture of homopolymers, copolymers as well as the graft itself, depending on the rate of polymerization of the monomers, the polymerization conditions and so forth.

The graft copolymer latices of the present invention can be treated during or after polymerization with antioxidants, biocides, defoamers, additional alkaline material such as $NH_4OH$ and so forth.

All of the graft copolymerization ingredients may be charged to the reactor at once and graft copolymerization continued to completion, or a seed type of latex may be formed by first graft copolymerizing part of the conjugated diene monomer and vinyl aryl monomer on the protein in the presence of some of the polymerization materials followed by further additions of the conjugated diene monomer and vinyl aryl monomer along with the remaining polymerization materials.

The latices of the present invention can be mixed with finely divided fillers such as paper coating fillers like clays, kaolin, calcium carbonate, titanium dioxide, zinc oxide and other inorganic fillers used in paper coating compositions. Thickening agents, viscosity stabilizers, additional alkaline material like $NH_4OH$ and so forth can be added to these compositions. In general paper coating compositions of the present invention will have a solids content of from about 20 to 70% by weight. The solids comprising from about 2 to 20% by weight, on a dry weight basis, of the graft copolymer and from 98 to 80% by weight of the paper coating fillers. The paper coating composition may be spread on paper and hot calendered to cure or set the graft copolymer and form an adherent and dried coating on the paper. For example, in some paper coating latices an acid containing comonomer is used, but, here, such a —COOH containing monomer is not needed. In using the latex in a paper coating composition additional co-binder is not required. The latex is useful as a binder for pigmented paper coating compositions to be printed by gravure or offset printing processes and is particularly useful in compositions for lightweight paper to be printed by the gravure process. The latex, also, can be used in compositions for cylinder boards.

The following examples will serve to illustrate the present invention with more particularity to those skilled in the art. In the examples the parts are parts by weight unless otherwise indicated.

TABLE I

| Ingredient | Parts (active, dry weight) |
| --- | --- |
| Styrene | 40 |
| Butadiene-1,3 | 41.5 |
| Soy Protein | 14.4 to 18.5* |
| SULFOLE 120 | .45 |
| SEQUESTRENE $Na_3$ | .05 |
| VAZO 64 | .6 |
| DREW L-198 | .1 |
| Deionized Water | to desired solids content (32–43% solids) |

*The protein solutions used were made to contain 1.08 p. PROXEL GXL/100 p (dry weights) protein to protect against bacterial attack. The proteins were solubilized in ammonia solution for 30 minutes, with enough ammonia being added to raise the pH to 9.0–9.5 and to a solids content of about 20%.

Notes for the Polymerization Procedure

SEQUESTRENE Na₃: Trisodium ethylene diamine tetraacetate dihydrate. Ciba-Geigy Corp.
SULFOLE 120: t-dodecyl mercaptan, avg. mol. wt. 198, calc. purity wt. % 96.8 and mercaptan sulfur wt. % 15.4. Phillips Petroleum Co., Rubber Chem. Div.
DREW L-198: Emulsifiable mixture of mineral oil, silica derivatives and esters. Defoamer. Drew Chemical Corp.
PROXEL GXL: Chemical biocide. ICI Americas Inc.
VAZO 64: 2,2'-axobisiobutyronitrile or $(CH_3)_2(CN)CN=NC(CN)(CH_3)_2$. duPont.
SOY PROTEIN: Anionic carboxylated soy protein in powder or powdered form. At 20% solids in alkaline media it has a Brookfield viscosity of about 2500 RVT (10 RPM) AT 25° C., Ralston Purina Company Polymer PP 2500. See U.S. Pat. No. 4,474,694.

The polymerization recipe was as follows:

To a clean, $N_2$ flushed reactor were charged deionized water, the SEQUESTRENE Na₃ and the soy protein with the DREW L-198 at a pH of from about 9 to 9.5. The temperature of the mixture was raised to 150° F. (65.6° C.), and the reactor was evacuated minimally to avoid losing $NH_4OH$. Next there were added to the reactor part of the styrene containing the VAZO 64 followed by part of the SULFOLE 120 and part of the butadiene-1,3, and polymerization was conducted to a total solids content of from about 14 to 16% by weight. Additional increments of styrene, SULFOLE 120 and butadiene-1,3 were added to the reactor to obtain a final theoretical solids content of the latex of about 32.2%. The reactor was cooled, and the latex was stripped of residual monomers. During this graft copolymerization the total amounts added of butadiene-1,3 were 41.5 parts, of SULFOLE 120 were 0.45 part and of styrene were 40.0 parts. The polymerization was conducted at a pH of 9 to 9.5. See U.S. Pat. No. 4,607,089.

Several graft latices were prepared using the above recipe. Some of the graft latices were used as seed latices; however, in the final latex the proportions of monomers and protein were essentially the same.

Latex treatment was done in a Microfluidics Model M-110 with cooling capability (ice water) and with a backflushing system. A prefilter was inserted before the interaction chamber since a preliminary experiment indicated some pressure buildup in the apparatus. The treatment was done at 100 psig. Either one or three passes were made through the apparatus.

Particle size measurements were made using a Nicomp quasielastic light scattering apparatus produced by Nicomp Instruments, Santa Barbara, California.

Viscosities were measured using a Brookfield LVF viscometer (60 rpm, varying spindle size) and a Haake Rotovisco RV100 viscometer at varying shear rates.

TABLE II

Effects of Microfluidization on Rheology of Protein Modified Styrene Butadiene Latices

| Latex Sample | Treatment | No. of Passes Through Microfluidizer | Percent Solids |
|---|---|---|---|
| A-1 | — | — | 31.7 |
| A-2 | Microfluidized[1] | 1 | 31.6 |
| A-3 | Microfluidized[1] | 3 | 31.5 |
| A-4 | — | — | 31.7 |
| A-5 | Sonified[2] | — | 32.1 |
| A-6 | — | — | 31.6 |
| A-7 | Homogenized[3] | — | 31.2 |
| B-1 | — | — | 38.0 |
| B-2 | Microfluidized[1] | 1 | 37.8 |
| B-3 | Microfluidized[1] | 3 | 38.0 |
| B-4 | — | — | 37.9 |
| B-5 | Homogenized[3] | — | 37.8 |
| C-1 | — | — | 39.9 |
| C-2 | Microfluidized[1] | 1 | 39.6 |
| C-3 | Homogenized[3] | — | 38.8 |

| Latex Sample | Brookfield Viscosity (60 rpm) | | Haake Rotovisco[4] Viscosities (mPa sec) | |
|---|---|---|---|---|
| | Viscosity (cps) | % Reduction | 270 sec⁻¹ | 2700 sec⁻¹ |
| A-1 | 44 | — | 27.2 | — |
| A-2 | 15.5 | 65 | 11.9 | 9.9 |
| A-3 | 16.1 | 63 | 11.9 | 9.8 |
| A-4 | 68 | — | 33.0 | 19.7 |
| A-5 | 40 | 41 | 13.3 | 10.9 |
| A-6 | 35.5 | — | 21.8 | 14.9 |
| A-7 | 14.0 | 61 | 12.0 | 9.4 |
| B-1 | 642 | — | 119 | 54.1 |
| B-2 | 159 | 75 | 56.7 | 30.3 |
| B-3 | 150 | 77 | 56.4 | 30.0 |
| B-4 | 237 | — | 65.9 | 35.3 |
| B-5 | 54.9 | 77 | 34.0 | 21.1 |
| C-1 | 804 | — | 150 | 65.0 |
| C-2 | 159 | 80 | 52.4 | 30.6 |
| C-3 | 144 | 82 | 57 | 34 | mPa = millipascal
[1] Microfluidization conducted at 100 psig, 300–500 ml/min nominal flow rate.
[2] Sonication was ten minute treatment with Sonifier Model S75, Branson Instrument Company; temperature maintained at room temperature by ice water cooling.
[3] Homogenization was at 2000 psig in a Manton-Gaulin Laboratory Homogenizer (about 1.6 liter/min. flow rate, continuous circulation of 1000 ml sample for about 30 minutes, until the temperature reached 65° C.)
[4] NV Rotor, 25° C.

Three different latex batches based on the recipe shown in Table I were used. Samples were taken at various times from each of these batches and labeled A-1 to A-7, B-1 to B-5 and C-1 to C-3. The times of taking samples and testing can explain some differences in initial solids contents due to aging of the batches.

Viscosity data obtained on the Microfluidized latices are given in Table II above. Also shown are viscosities obtained on latices treated with ultrasonic irradiation or by homogenization, and the percent reduction in viscosity due to the particular treatment.

One pass through the Microfluidizer was shown to be about as effective as three passes in reducing latex viscosity. The Haake results indicate that the Microfluidization process is as effective as either sonication or homogenization in reducing the viscosity. Some reduction in the viscosity of the untreated latices was seen with aging time over a period of several months. For example, compare A-4, A-1 and A-6 or B-1 and B-4. However, the relative reductions in viscosity obtained at any given time using the homogenization and microfluidization seem equivalent with perhaps a lower relative reduction observed in the sonicated latex (after 10 minutes treatment).

The lower shear viscosities (Brookfield and 270 sec¹ Haake results) show greater reductions on treatment than the high shear rate values. This is interpreted as being caused by a breakdown in structure in the latices, which structure contributes primarily to the low shear viscosities.

TABLE III

Nicomp Particle Size Results on Microfluidized Latices

| Sample Latex | Number of Passes | Bimodal Distribution First Peak | |
|---|---|---|---|
| | | Avg. Diam. (nm) | wt % |

TABLE III-continued

| Nicomp Particle Size Results on Microfluidized Latices | | | |
|---|---|---|---|
| A-1 | 0 | 111 | 57 |
| A-2 | 1 | — | — |
| A-3 | 3 | 143 | 91 |
| B-1 | 0 | 109 | 22 |
| B-2 | 1 | 158 | 100 |
| B-3 | 3 | 158 | 100 |
| C-1 | 0 | 88 | 58 |
| C-2 | 1 | 156 | 100 |

| Sample Latex | Bimodal Distribution | | Mean Diameter (nm) | Equivalent Gaussion Distribution Mean Diam. (nm) |
|---|---|---|---|---|
| | Second Peak | | | |
| | Avg. Diam. (nm) | wt % | | |
| A-1 | 273 | 43 | 182 | 180 |
| A-2 | — | — | — | 149 |
| A-3 | 429 | 9 | 166 | 138 |
| B-1 | 214 | 78 | 197 | 193 |
| B-2 | — | — | 158 | 145 |
| B-3 | — | — | 157 | 138 |
| C-1 | 273 | 42 | 182 | 191 |
| C-2 | — | — | 156 | 145 | nm = nanometer

In Table III are summarized the particle size results obtained on the Microfluidized latices. These results indicate reductions in mean particle diameter caused by reductions in the size and/or amount of "large" particles in the latices. This light scattering technique interprets groups of particles as being single large particles. Breakup of such particle groupings would give these results.

In summary, microfluidization is shown to be an effective technique for reducing the viscosity of protein-modified styrene-butadiene latices. The technique appears to give equivalent results to those obtainable with either homogenization or sonication.

We claim:

1. The method which comprises microfluidizing by interacting two protein-modified alkaline latex fluidized streams in an interaction chamber for a period of time sufficient to reduce the viscosity of and to increase the light transmission of said latex, said fluidized stream being an alkaline latex of a graft or over copolymer of at least one copolymerizable conjugated diene monomer having from 4 to 6 carbon atoms and at least one copolymerizable vinyl aryl monomer having from 8 to 12 carbon atoms and free of an organic carboxylic acid monomer where
   (a) said conjugated diene monomer is used in an amount of from about 25 to 50 parts by weight,
   (b) said vinyl aryl monomer is used in an amount of from 30 to 60 parts by weight, and
   (c) said protein is used in an amount of from 10 to 30 parts by weight, the sum of (a), (b) and (c) being 100 parts by weight.

2. The method according to claim 1 where said conjugated diene monomer is butadiene-1,3, said vinyl aryl monomer is styrene and said protein is soy protein.

3. The product produced by the method of claim 1.

4. The product produced by the method of claim 2.

5. The method according to claim 1, including applying said latex to a paper substrate.

6. The method according to claim 2, including applying said latex to a paper substrate.

* * * * *